(12) United States Patent  
Mizuno (10) Patent No.: US 9,306,629 B2  
(45) Date of Patent: Apr. 5, 2016

(54) MOBILE DEVICE USING INFORMATION ACQUIRED VIA NEAR FIELD COMMUNICATION

(71) Applicant: CASIO COMPUTER CO., LTD., Shibuya-ku, Tokyo (JP)

(72) Inventor: Kimiyasu Mizuno, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/274,119

(22) Filed: May 9, 2014

(65) Prior Publication Data

US 2015/0004905 A1    Jan. 1, 2015

(30) Foreign Application Priority Data

Jun. 27, 2013  (JP) .................................. 2013-134411

(51) Int. Cl.
*H04B 5/00* (2006.01)
(52) U.S. Cl.
CPC .................................... *H04B 5/0031* (2013.01)
(58) Field of Classification Search
CPC .......... H04B 5/02; H04B 5/0012; H04B 5/00; H04B 5/0031; G06K 19/0723; G06K 7/0008
USPC ............. 455/41.1, 418–420, 500, 507, 550.1, 455/556.1, 556.2
See application file for complete search history.

(56) References Cited

U.S. PATENT DOCUMENTS

| 8,214,459 | B2 | 7/2012 | Matsubara et al. |
| 8,549,109 | B2 | 10/2013 | Matsubara et al. |
| 8,892,688 | B2 | 11/2014 | Matsubara et al. |
| 2009/0287807 | A1* | 11/2009 | Sueyoshi ...................... 709/223 |
| 2014/0187233 | A1* | 7/2014 | Chen et al. ................. 455/422.1 |
| 2015/0019970 | A1 | 1/2015 | Matsubara et al. |

FOREIGN PATENT DOCUMENTS

| JP | 2002269508 A | 9/2002 |
| JP | 2005159958 A | 6/2005 |
| JP | 2009080593 A | 4/2009 |
| JP | 2010-039658 A | 2/2010 |

OTHER PUBLICATIONS

Japanese Office Action (and English translation thereof) dated May 26, 2015, issued in counterpart Japanese Application No. 2013-134411.

* cited by examiner

*Primary Examiner* — Nhan Le
(74) *Attorney, Agent, or Firm* — Holtz, Holtz, & Volek PC (57) ABSTRACT

There is provided a mobile device including: a first communication unit configured to perform contactless communication; a second communication unit configured to perform wireless communication with an external device; a designation control unit configured to make a user designate an own device or the external device as an entity using specific information that is received from outside via contactless communication by the first communication unit; a first specific process unit configured to execute a specific process to use the specific information when the user designates the own device as the entity using the specific information; and a transmitting control unit configured to make the second communication unit transmit the specific information received by the first communication unit to the external device, when the user designates the external device as the entity using the specific information.

17 Claims, 10 Drawing Sheets

MOBILE DEVICE USING INFORMATION ACQUIRED VIA NEAR FIELD COMMUNICATION

CROSS-REFERENCE TO RELATED APPLICATIONS

This application is based upon and claims the benefit of priority from the prior Japanese Patent Application No. 2013-134411, filed on Jun. 27, 2013, the entire contents of which are incorporated herein by reference.

FIELD OF THE INVENTION

The present invention relates to a mobile device which uses information acquired via near field communication.

BACKGROUND OF THE INVENTION

As a technology that uses proximity contactless communication (hereinafter referred to as contactless communication) such as NFC (Near Field Communication), there is described a technology in JP 2010-039658 A, for example, where an IC tag is embedded in various information media such as a guide board, a bulletin board, and a poster so that access information stored in the IC tag is provided to a mobile information terminal which has a built-in contactless IC reader/writer, the access information including a URL to access specific content on the Internet. The specific content here refers to a specific web page (including a home page) and/or a specific image or moving image, for example.

According to such technology, a user of the mobile information terminal need only hold the mobile information terminal over the various information media to be able to acquire the access information and at the same time browse a specific web page indicated in the access information and check a specific image or moving image. That is, the specific content can easily be reproduced by just holding the mobile information terminal over the various information media.

SUMMARY OF THE INVENTION

One aspect of the present invention is to provide a mobile device including: a first communication unit configured to perform contactless communication; a second communication unit configured to perform wireless communication with an external device; a designation control unit configured to make a user designate an own device or the external device as an entity using specific information that is received from outside via contactless communication by the first communication unit; a first specific process unit configured to execute a specific process to use the specific information when the user designates the own device as the entity using the specific information; and a transmitting control unit configured to make the second communication unit transmit the specific information received by the first communication unit to the external device, when the user designates the external device as the entity using the specific information.

Another aspect of the present invention is to provide an information utilization method performed by a mobile device including a first communication unit configured to perform contactless communication and a second communication unit configured to perform wireless communication with an external device. The method includes: a step of making a user designate an own device or the external device as an entity using specific information that is received from outside via contactless communication by the first communication unit; a step of executing a specific process to use the specific information when the user designates the own device as the entity using the specific information; and a step of making the second communication unit transmit the specific information received by the first communication unit to the external device, when the user designates the external device as the entity using the specific information.

Yet another aspect of the present invention is to provide a non-transitory computer readable medium in which a program is recorded, the program causing a computer, which includes a first communication unit configured to perform contactless communication and a second communication unit configured to perform wireless communication with an external device, to execute: a designation control unit configured to make a user designate an own device or the external device as an entity using specific information that is received from outside via contactless communication by the first communication unit; a specific process unit configured to execute a specific process to use the specific information when the user designates the own device as the entity using the specific information; and a transmitting control unit configured to make the second communication unit transmit the specific information received by the first communication unit to the external device, when the user designates the external device as the entity using the specific information.

Yet another aspect of the present invention is to provide an information utilization system that is an information processing system including a mobile device and an external device that can perform wireless communication with the mobile device. The mobile device includes: a first communication unit configured to perform contactless communication; a second communication unit configured to perform wireless communication with the external device; a designation control unit configured to make a user designate an own device or the external device as an entity using specific information that is received from outside via contactless communication by the first communication unit; a first specific process unit configured to execute a specific process to use the specific information when the user designates the own device as the entity using the specific information; and a transmitting control unit configured to make the second communication unit transmit the specific information received by the first communication unit to the external device, when the user designates the external device as the entity using the specific information. The external device includes: a receiving unit configured to receive the specific information transmitted from the mobile device via the wireless communication; and a second specific process unit configured to execute a specific process to use the specific information received by the receiving unit.

DETAILED DESCRIPTION OF THE PREFERRED EMBODIMENTS

Embodiments of the present invention will be described below with reference to the drawings.

Embodiment 1

Figure 1:
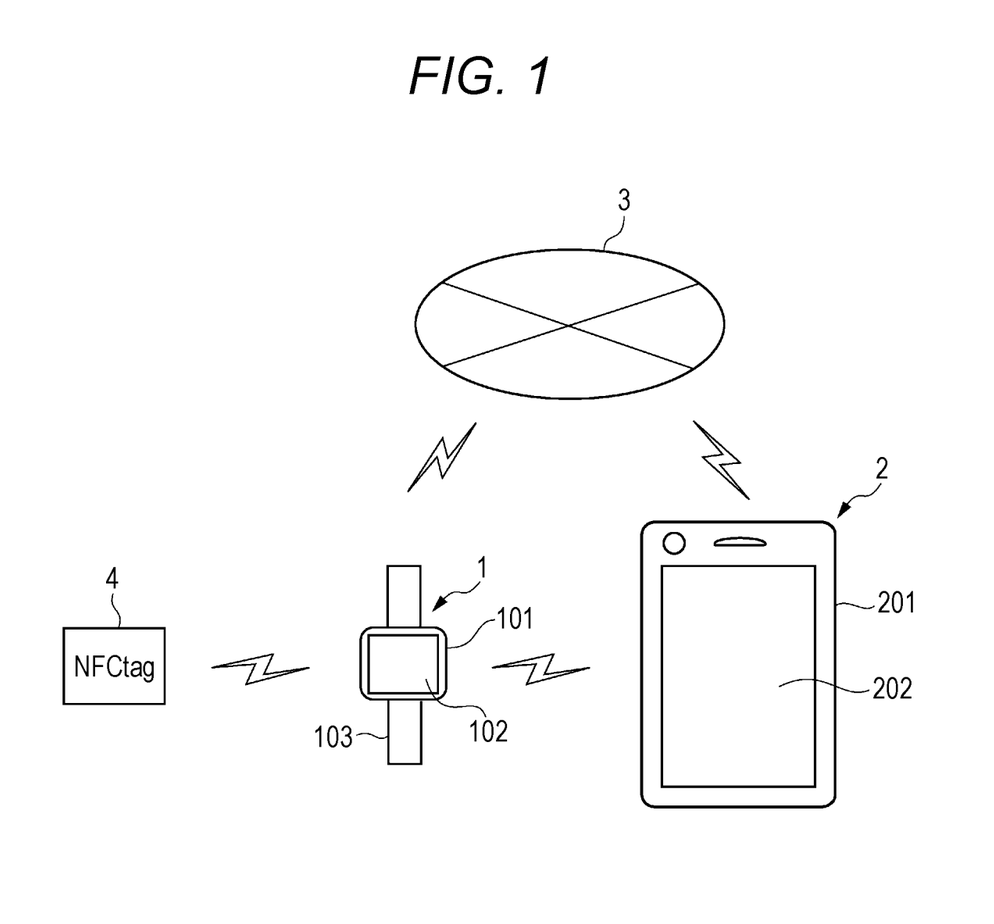
FIG. 1 is a diagram illustrating an information utilization system according to first embodiment.

FIG. 1 is a diagram illustrating an information utilization system according to first embodiment of the present invention. The information utilization system of the present embodiment includes a wrist terminal 1 and a smart phone (a multifunctional mobile phone) 2 that can exchange data between each other via Bluetooth (Registered Trademark).

The wrist terminal 1 is of a wristwatch type that can be worn on the wrist of a user, and includes a watch case 101, a display unit 102 which is disposed on top of the watch case 101 and functions as a touch panel, and a wristband 103 which is fitted on both ends of the watch case 101.

Moreover, as described below, the wrist terminal 1 can be connected to Internet 3 via wireless communication, includes a function as an NFC tag reader, and can thus acquire tag information stored in an NFC tag 4 via contactless communication (proximity contactless communication) by means of the NFC.

The NFC tag 4 embedded in a guide board, a bulletin board, a poster or the like is a passive tag which is formed of a loop antenna, a contactless IC chip, and a non-volatile memory but is not equipped with a power source. Here, the tag information stored in the NFC tag 4 is a piece of address information for connection used to access specific content on the Internet, and is a URL indicating a specific web page (including a home page), a specific image, or a specific moving image, for example.

The smart phone 2 includes a device body 201 having an oblong shape as is well known and a display unit 202 which is disposed on the device body 201 and functions as a touch panel. The smart phone 2 can be connected to the Internet 3 via wireless communication.

Figure 2:
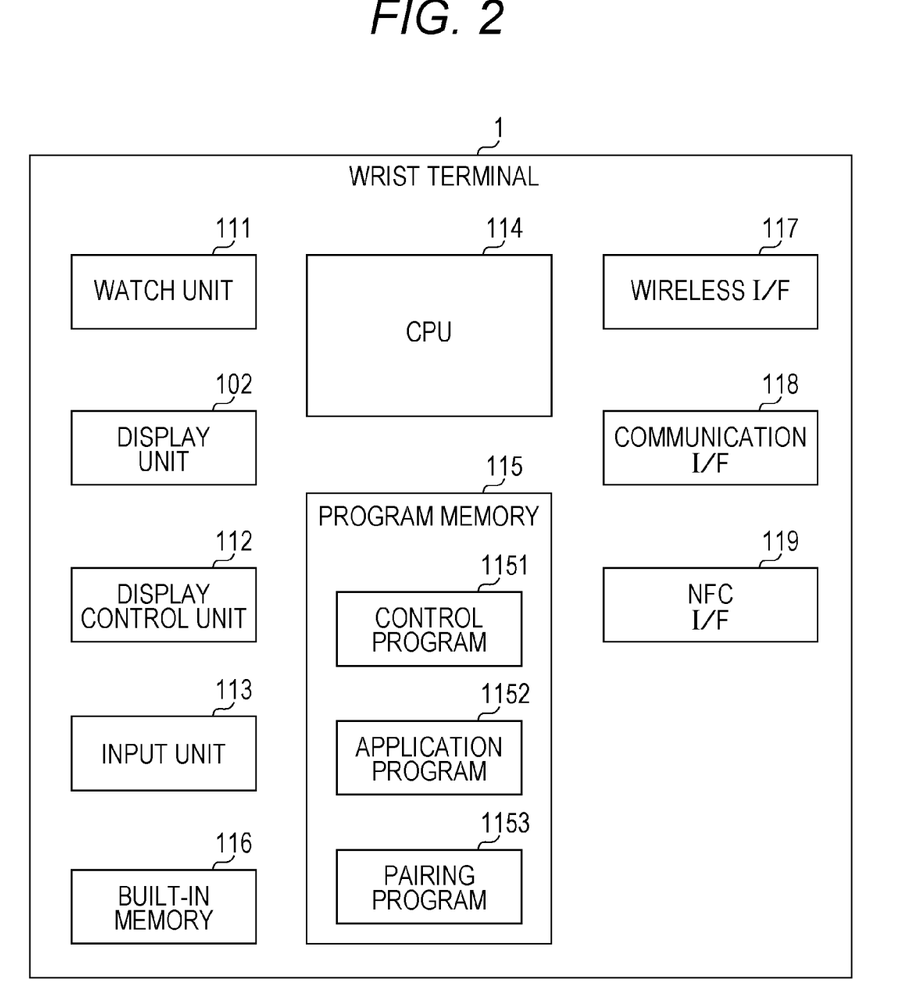
FIG. 2 is a block diagram illustrating a wrist terminal common to each embodiment.

FIG. 2 is a schematic block diagram illustrating a circuit configuration of the wrist terminal 1. A watch unit 111 counts the current time. The display unit 102 is formed of a color LCD (Liquid Crystal Display), a drive circuit driving the display, and the like. A display control unit 112 controls a display state of the display unit 102. An input unit 113 is formed of various switches that are omitted from FIG. 1. The input unit 113 further includes a touch sensor and a drive circuit thereof, the touch sensor covering the surface of the color LCD of the display unit 102 and making the display unit 102 function as a touch panel.

A CPU (Central Processing Unit) 114 controls the entire wrist terminal 1. A program memory 115 stores a control program 1151, an application program 1152, and a pairing program 1153 in advance.

The control program 1151 is a basic control program provided to make the CPU 114 control the entire wrist terminal 1. The application program 1152 is formed of a plurality of types of application programs provided to make the CPU 114 execute a variety of processes including a process described later. The pairing program 1153 is a program provided to perform pairing (connection setting) with the most proximate smart phone 2 or the like.

A built-in memory 116 such as a flash memory stores various pieces of setting information used to determine the details of operation of the wrist terminal 1 as well as other data.

A wireless I/F 117 performs transmitting/receiving to/from the smart phone 2 via Bluetooth. A communication I/F 118 is provided to connect the wrist terminal 1 to the Internet 3 by using a public line such as a wireless LAN.

An NFC I/F 119 includes a loop antenna and a transmitting/receiving circuit to perform contactless communication with the NFC tag 4 by means of the NFC and acquire the URL from the NFC tag 4.

Figure 3:
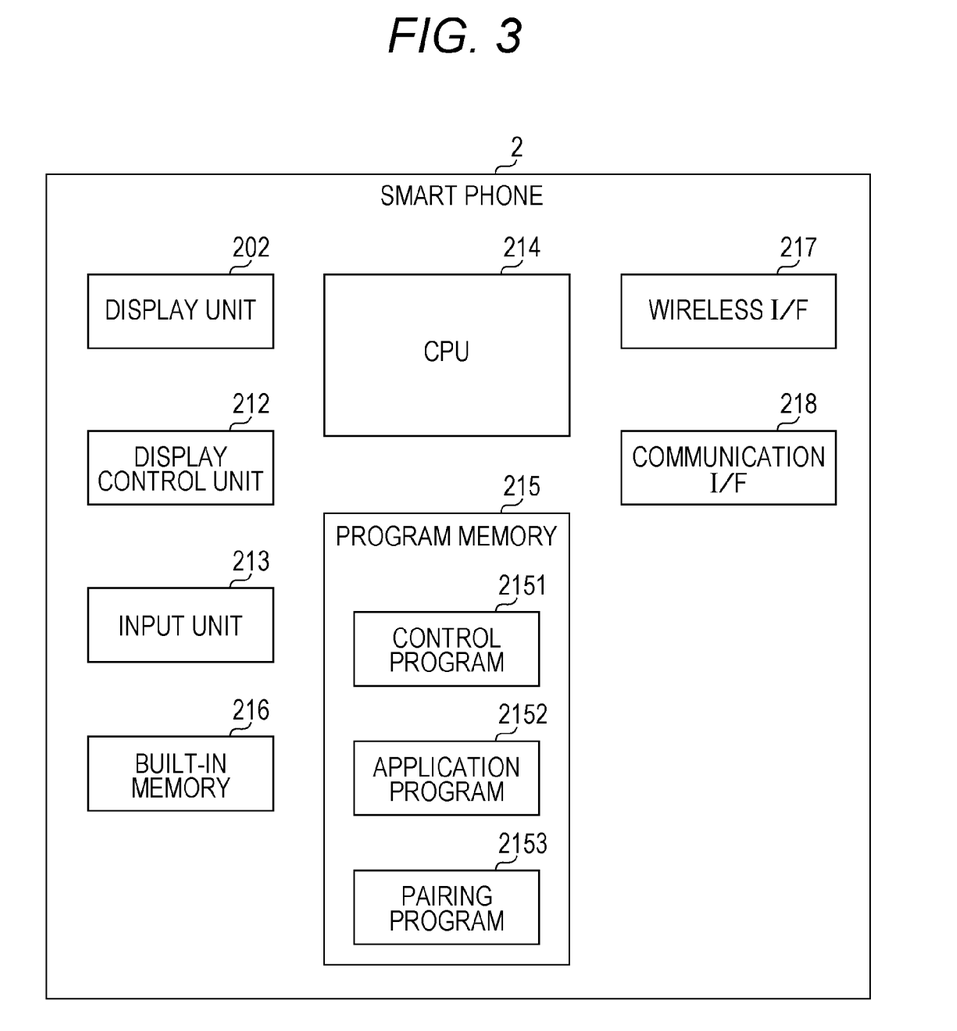
FIG. 3 is a block diagram illustrating a smart phone common to each embodiment.

FIG. 3 is a schematic block diagram illustrating a circuit configuration of the smart phone 2. The display unit 202 is formed of a color LCD, a drive circuit driving the display, and the like. A display control unit 212 controls a display state of the display unit 202. An input unit 213 is formed of a power source key and various other keys that are omitted from FIG. 1. The input unit 213 further includes a touch sensor and a drive circuit thereof, the touch sensor covering the surface of the color LCD of the display unit 202 and making the display unit 202 function as a touch panel.

A CPU 214 controls the entire smart phone 2. A program memory 215 stores in advance a control program 2151, an application program 2152, and a pairing program 2153.

The control program 2151 is a basic control program provided to make the CPU 214 control the entire smart phone 2. The application program 2152 is formed of a plurality of types of application programs provided to make the CPU 214 execute various processes including a process described below. The pairing program 2153 is a program provided to perform pairing (connection setting) with the most proximate wrist terminal 1.

A built-in memory 216 such as a flash memory stores various pieces of setting information used to determine the details of operation of the smart phone 2 as well as other data.

A wireless I/F 217 performs transmitting/receiving to/from the wrist terminal 1 via Bluetooth. A communication I/F 218 is provided to connect the smart phone 2 to the Internet 3 by using a public line such as Wi-Fi or the wireless LAN.

Note that the smart phone 2 includes a well-known circuit to perform voice communication and/or data communication, the circuit including a voice input circuit and a transmitting circuit to modulate input voice for transmission, a receiving circuit and a reproduction circuit to receive, decode, and reproduce a voice signal being received, and a data transmitting/receiving circuit. These circuits are not shown or described herein.

Next, an operation of the aforementioned wrist terminal 1 and smart phone 2 according to the present invention will be described with reference to FIGS. 4 and 5.

Figure 4:
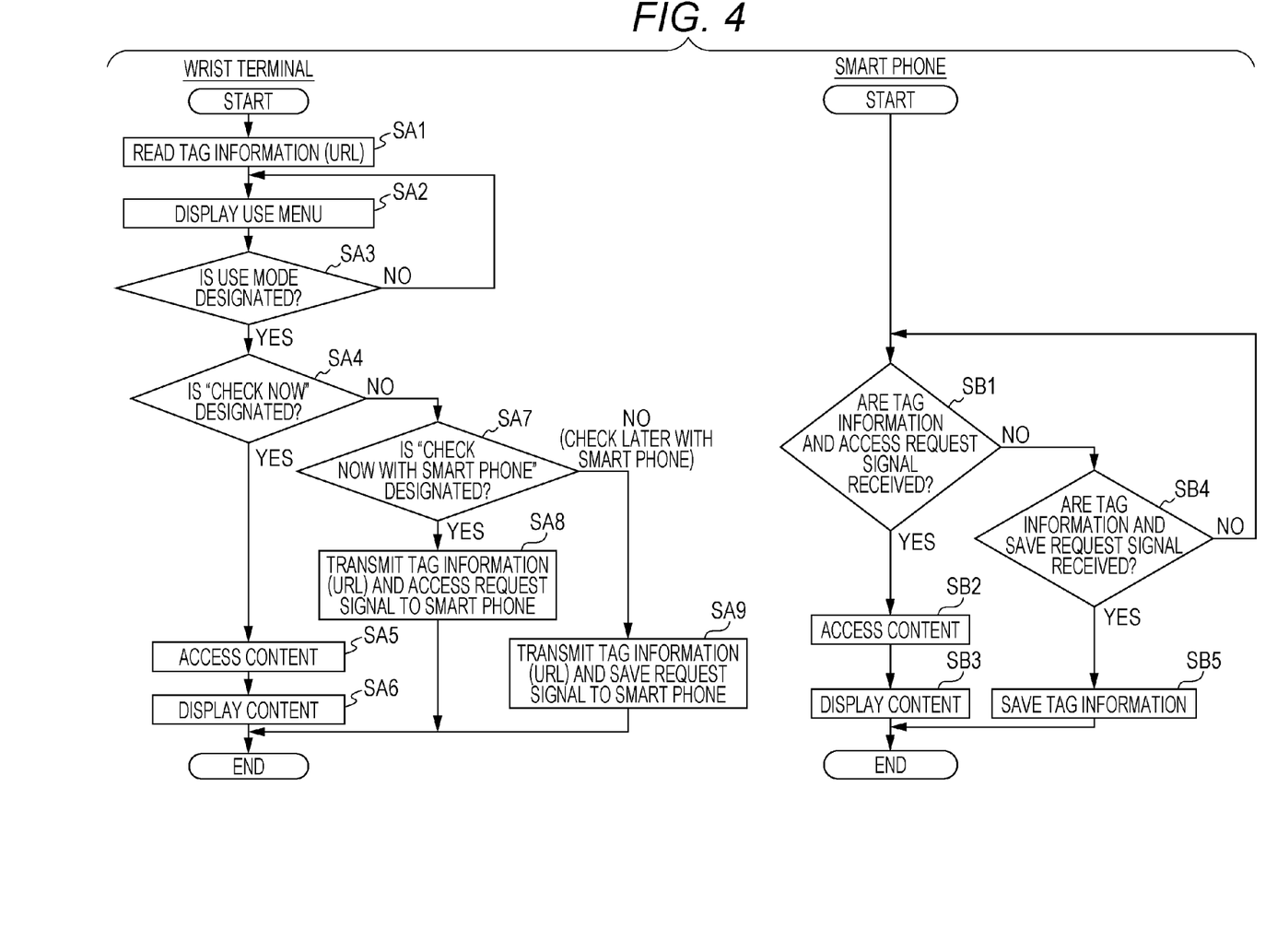
FIG. 4 is a set of flowcharts illustrating an operation of the wrist terminal and the smart phone.

FIG. 4 is a set of flowcharts illustrating the operation of the wrist terminal 1 and the operation of the smart phone 2 performed while both are on standby to be able to communicate data between each other after a known pairing process is performed by Bluetooth. The operation of the wrist terminal is performed by the CPU 114 executing the control program 1151 and a predetermined application program 1152, while the operation of the smart phone is performed by the CPU 214 executing the control program 2151 and a predetermined application program 2152.

More specifically, FIG. 4 is a set of flowcharts illustrating each operation performed when the user holds the wrist terminal 1 over the NFC tag 4 while the predetermined application program is started by a predetermined operation.

Figure 5A:
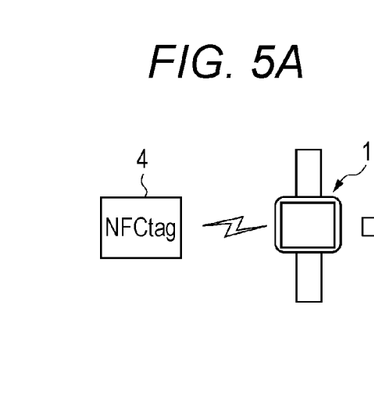
FIGS. 5A to 5E are diagrams illustrating the operation of the wrist terminal and the smart phone.

The power is supplied to the NFC I/F 119 in the wrist terminal 1 while the predetermined application program is started so that, once the user holds the wrist terminal 1 over the NFC tag 4, the wrist terminal 1 immediately reads tag information (a URL) from the NFC tag 4 via contactless communication by way of the NFC I/F 119, as illustrated in FIG. 5A (step SA1).

Specifically, the wrist terminal 1 drives a contactless IC chip of the NFC tag 4 by using the power supplied to the NFC I/F 119 and then receives the tag information stored in the non-volatile memory.

Figure 5B:
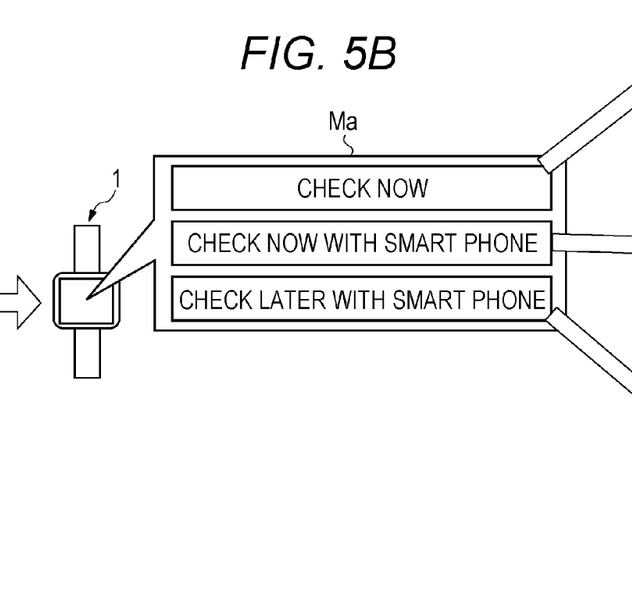

Subsequently, as illustrated in FIG. 5B, the wrist terminal 1 displays a use menu Ma on the display unit 102 (step SA2). The use menu Ma allows the user to designate a use mode of the address information for connection where three use modes can be designated from the use menu Ma including "check now", "check now with smart phone", and "check later with smart phone".

The wrist terminal 1 continues displaying the use menu Ma until any use mode is designated by the user (step SA3: NO), and performs the following operation when any use mode is designated by the user (step SA3: YES).

Figure 5C:
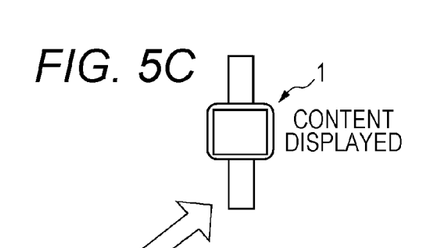

That is, when the use mode "check now" is designated by the user (step SA4: YES), the wrist terminal 1 immediately connects to the Internet 3 by way of the communication I/F 118 and accesses predetermined content (a web page, an image, or the like) on the Web indicated by the tag information (step SA5). The wrist terminal then displays the predetermined content on the display unit 102 as illustrated in FIG. 5C (step SA6).

Accordingly, the user can immediately browse the contents related to a guide board, a bulletin board, or a poster by just holding the wrist terminal 1 worn on the arm over the NFC tag 4.

When the use mode "check now with smart phone" is designated by the user (step SA4: NO and step SA7: YES), the wrist terminal 1 uses the wireless I/F 117 to transmit the tag information (URL) and an access request signal to the smart phone 2 via Bluetooth, the access request signal making a request to access the predetermined content indicated by the tag information (step SA8).

Moreover, when the use mode "check later with smart phone" is designated from the use menu Ma by the user (step SA7: NO), the wrist terminal 1 uses the wireless I/F 117 to transmit the tag information (URL) and a save request signal to the smart phone 2 via Bluetooth, the save request signal making a request to save the tag information (step SA9).

Figure 5D:
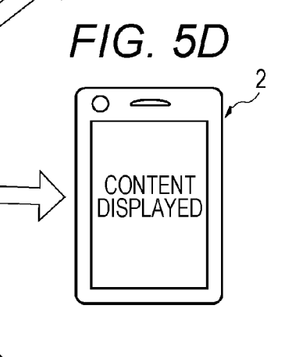

On the other hand, the smart phone 2 is on standby for Bluetooth communication after being paired with the wrist terminal 1. Upon receiving the tag information (URL) and the access request signal from the wrist terminal 1 during that time (step SB1: YES), the smart phone 2 immediately connects to the Internet 3 by way of the communication I/F 218 and accesses the predetermined content on the Web (a home page, an image, or the like) indicated by the tag information (step SB2). The smart phone 2 then displays the predetermined content on the display unit 102 as illustrated in FIG. 5D (step SB3).

The user can therefore use the wrist terminal 1 as an NFC tag reader of the smart phone 2 to immediately browse the contents related to the guide board, the bulletin board, or the poster on the smart phone 2 even when the smart phone 2 does not have the function as the NFC tag reader.

Figure 5E:
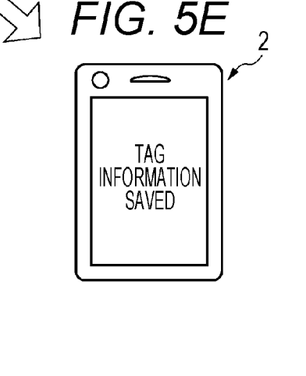

Upon receiving the tag information (URL) and the save request signal from the wrist terminal 1 (step SB4: YES), the smart phone 2 saves the received tag information (URL) in the built-in memory 216 as illustrated in FIG. 5E (step SB5).

As a result, the user can use the wrist terminal 1 as the NFC tag reader of the smart phone 2 to save the tag information in the smart phone 2 and browse the contents related to the guide board, the bulletin board, or the poster by using the smart phone 2 at any moment in time.

The wrist terminal 1 of the present embodiment described above can not only use the tag information acquired from the NFC tag 4 in the own unit but can also make the information available in the smart phone 2 as needed. This can therefore improve the convenience when using the tag information, namely, a specific piece of information acquired via contactless communication.

Note that while there has been described the case where the wrist terminal 1 is used in combination with the smart phone 2 in the present embodiment, the tag information may be provided to an arbitrary external device such as a tablet mobile information terminal with a screen larger than that of the smart phone 2.

In this case, the user can easily acquire the tag information from the NFC tag 4 by using the wrist terminal 1 even when the tablet mobile information terminal or the like has the function as an NFC tag reader, whereby the user can easily reproduce the contents related to the guide board, the bulletin board, or the poster without taking the trouble to hold the mobile information terminal or the like with a large external diameter over the guide board, the bulletin board, or the poster.

Embodiment 2

Figure 6:
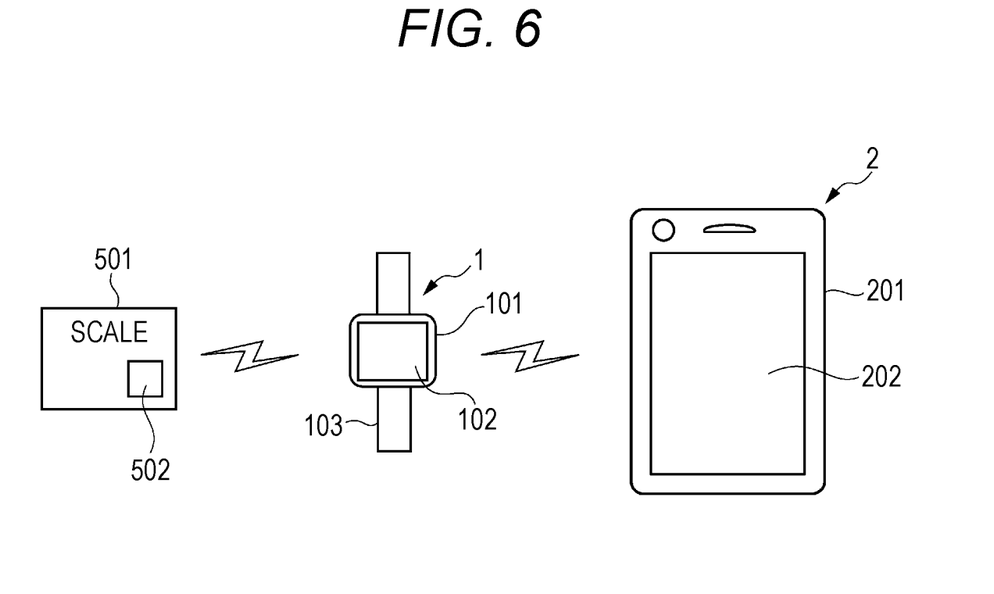
FIG. 6 is a diagram illustrating an information utilization system according to second embodiment.

Next, second embodiment of the present invention will be described. FIG. 6 is a diagram illustrating an information utilization system according to the second embodiment of the present invention. In the present embodiment, a wrist terminal 1 described in the first embodiment acquires (receives) a predetermined piece of tag information from an NFC tag 502 built in a scale 501 so that the acquired tag information is used in the wrist terminal 1 or a smart phone 2.

Note that a circuit configuration of the wrist terminal 1 and the smart phone 2 is similar to that of the first embodiment. However, the wrist terminal 1 of the present embodiment can not only receive the tag information from the scale 501 via contactless communication with use of NFC but also transmit a predetermined piece of information to the scale 501, thereby having a reader/writer function for an NFC tag.

The scale 501 is a load-cell or electromagnetic type scale that electrically measures weight, and is configured to store a measurement result of weight of a plurality of persons measured in the past individually into a built-in memory. Furthermore, the scale 501 including the NFC tag 502 can transmit/receive data to/from an external device via contactless communication with use of the NFC. That is, the scale 501 has a function to transmit to the external device a history of the measurement result (hereinafter referred to as a measurement history) of each person stored in advance.

In other words, the tag information acquired from the NFC tag 502 by the wrist terminal 1 of the present embodiment is the measurement history of weight of any person stored in the scale 501.

Note that the NFC tag 502 built in the scale 501 includes a loop antenna, a contactless IC chip, and a memory so that the scale 501 can detect a radio wave (carrier wave) of a communicable level from the external device including the wrist terminal 1 when the loop antenna receives such wave.

Figure 7:
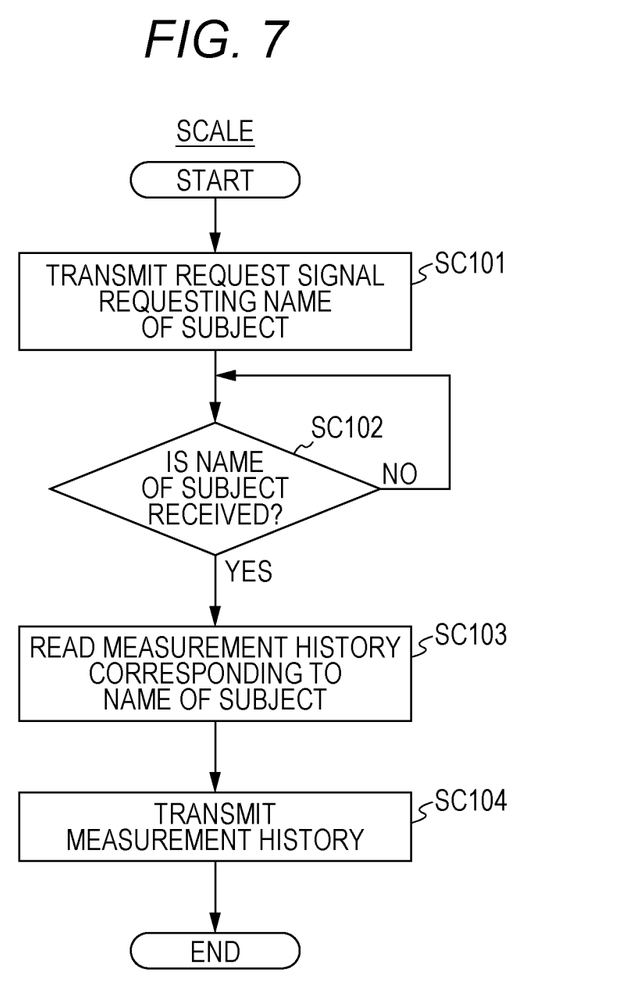
FIG. 7 is a flowchart illustrating an operation of a scale.

Here, a flowchart illustrated in FIG. 7 will be used to describe an operation performed when the scale 501 transmits the measurement history to the wrist terminal 1 that is the external device through the NFC tag 502, before describing an operation according to the present invention performed by the wrist terminal 1 and the smart phone 2 of the present embodiment.

The scale 501 starts the operation upon detecting that the wrist terminal 1 is held over the NFC tag 502 by the user, immediately transmits to the wrist terminal 1 a request signal requesting the name of a subject (step SC101), and then waits for the name of the subject to be received (step SC102).

Upon receiving the name of the subject (step SC102: YES), the scale 501 reads out a measurement history corresponding to the received name of the subject from the built-in memory (step SC103), and then transmits the measurement history of the specific subject being read to the wrist terminal 1 (step SC104).

Now, the operation according to the present invention performed by the wrist terminal 1 and the smart phone 2 of the present embodiment will be described with reference to FIGS. 8 to 10.

Figure 8:
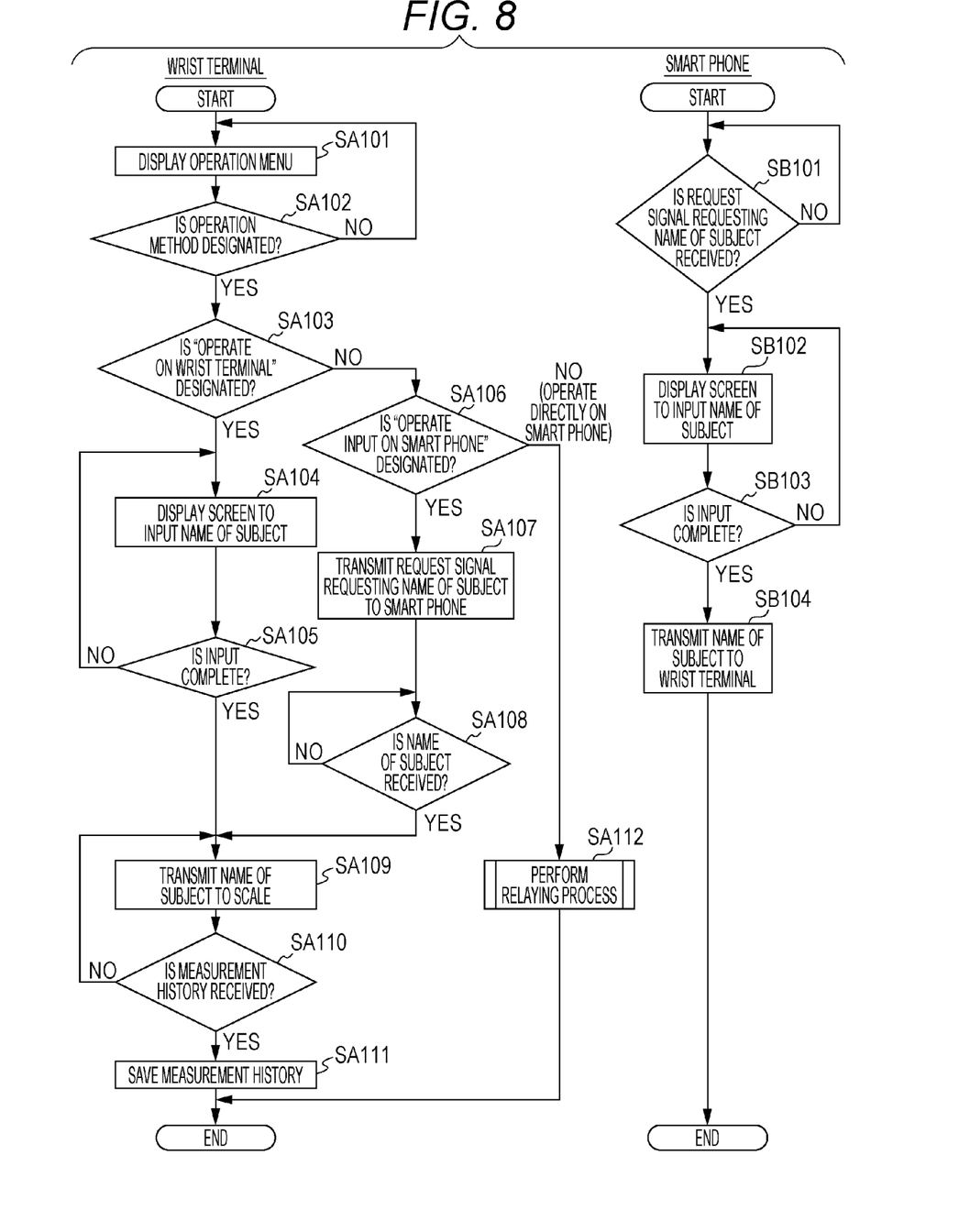
FIG. 8 is a set of flowcharts illustrating the operation of the wrist terminal and the smart phone.

FIG. 8 is a set of flowcharts also illustrating the operation of the wrist terminal 1 and the operation of the smart phone 2 performed while both are on standby to be able to communicate data between each other after the known pairing process is performed by Bluetooth. The operation of the wrist terminal is performed by the CPU 114 executing the control program 1151 and a predetermined application program included in the application program 1152 and corresponding to the scale 501, while the operation of the smart phone is performed by the CPU 214 executing the control program 2151 and a predetermined application program included in the application program 2152 and corresponding to the scale 501.

Figure 10A:
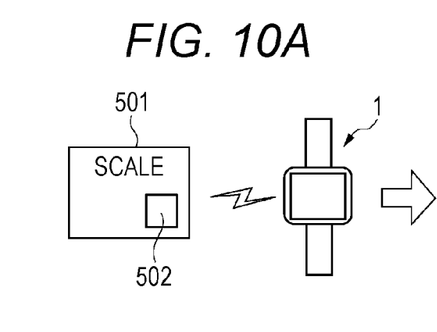
FIGS. 10A to 10E are diagrams illustrating the operation of the wrist terminal and the smart phone.
Figures 10B, 10C, 10D, 10E:
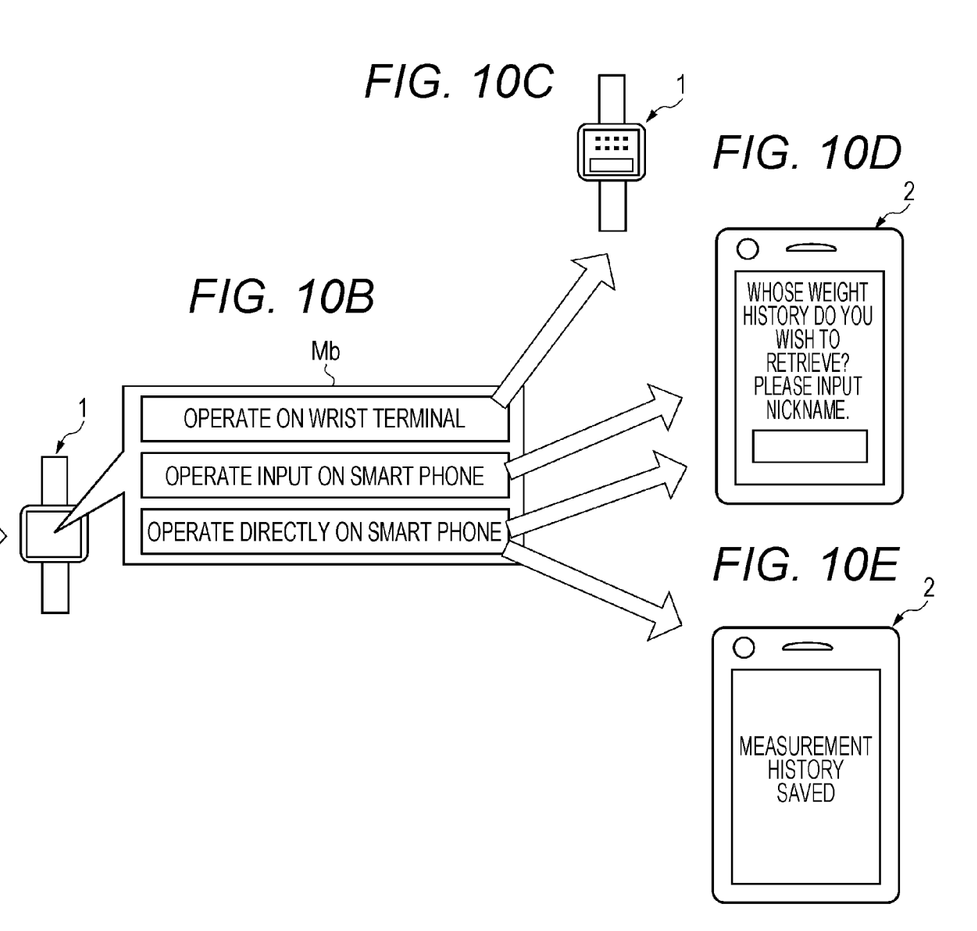

As illustrated in FIG. 10A, the wrist terminal 1 of the present embodiment starts the operation by receiving the request signal requesting the name of the subject from the scale 501 by way of the NFC I/F 119 when the user holds the wrist terminal 1 over the NFC tag 502 of the scale 501, and then displays an operation menu Mb on the display unit 102 as illustrated in FIG. 10B (step SA101).

The operation menu Mb displayed in the present embodiment allows the user to designate a method of operation to use the measurement history of a specific person (subject) stored in the scale 501, where three operation methods can be designated from the operation menu Mb including "operate on wrist terminal", "operate input on smart phone", and "operate directly on smart phone".

Here, the methods "operate on wrist terminal" and "operate input on smart phone" are performed to use the measurement history on the wrist terminal 1, meaning that these operation methods are designated to designate the wrist terminal 1 as an entity in which the measurement history is used. The method "operate directly on smart phone" is performed to use the measurement history on the smart phone 2 as described later, meaning that this operation method is designated to designate the smart phone 2 as an entity in which the measurement history is used.

The wrist terminal 1 continues displaying the operation menu Mb until any operation method is designated by the user (step SA102: NO), and performs the following operation when any operation method is designated by the user (step SA102: YES).

That is, when the method "operate on wrist terminal" is designated by the user (step SA103: YES), the wrist terminal 1 displays a screen to input the name of the subject on the display unit 102 as illustrated in FIG. 10C (step SA104), so that the user inputs the name of the subject on the wrist terminal 1.

The wrist terminal 1 waits until the user inputs the name of the subject (step SA105: NO) and, once the name of the subject is input (step SA105: YES), transmits the input name of the subject to the scale 501 by way of the NFC I/F 119 (step SA109).

Subsequently, the wrist terminal 1 receives the measurement result from the scale 501 (step SA110: YES) and saves the received measurement result in the built-in memory 116 (step SA111).

As a result, the measurement history of the arbitrary subject designated by the user becomes available for use on the wrist terminal 1. Specifically, the measurement history on the wrist terminal 1 is used by displaying the past measurement result one by one on the display unit 102 or displaying the graphical representation of the past measurement result. Moreover, the measurement history is used by using a predetermined application program corresponding to the scale 501.

When the method "operate input on smart phone" is designated in the operation menu Mb (step SA103: NO and step SA106: YES), the wrist terminal 1 immediately transmits the request signal requesting the name of the subject to the smart phone 2 (step SA107) and waits for the name of the subject to be received (step SA108).

On the other hand, the smart phone 2 paired with the wrist terminal 1 is on standby to perform communication via Bluetooth. Upon receiving the request signal requesting the name of the subject from the wrist terminal 1 (step SB101: YES), the smart phone 2 displays a screen to input the name of the subject (a "nickname" in the figure) on the display unit 202 as illustrated in FIG. 10D (step SB102), so that the user inputs the name of the subject on the smart phone 2.

Subsequently, the smart phone 2 waits until the user inputs the name of the subject (step SB103: NO) and, once the name of the subject is input (step SB103: YES), transmits the input name of the subject to the wrist terminal 1 by way of the wireless I/F 217 (step SB104).

The wrist terminal 1 receives the name of the subject from the smart phone 2 (step SA108: YES) and transmits the received name of the subject to the scale 501 by way of the NFC I/F 119 (step SA109).

In this case as well, the wrist terminal 1 receives the measurement history from the scale 501 (step SA110: YES) and saves the received measurement history in the built-in memory 116 (step SA111). Accordingly, the measurement history of the arbitrary subject designated by the user becomes available for use on the wrist terminal 1.

When the method "operate directly on smart phone" is designated in the operation menu Mb (step SA106: NO), the wrist terminal 1 performs a relaying process described below (step SA112).

Figure 9:
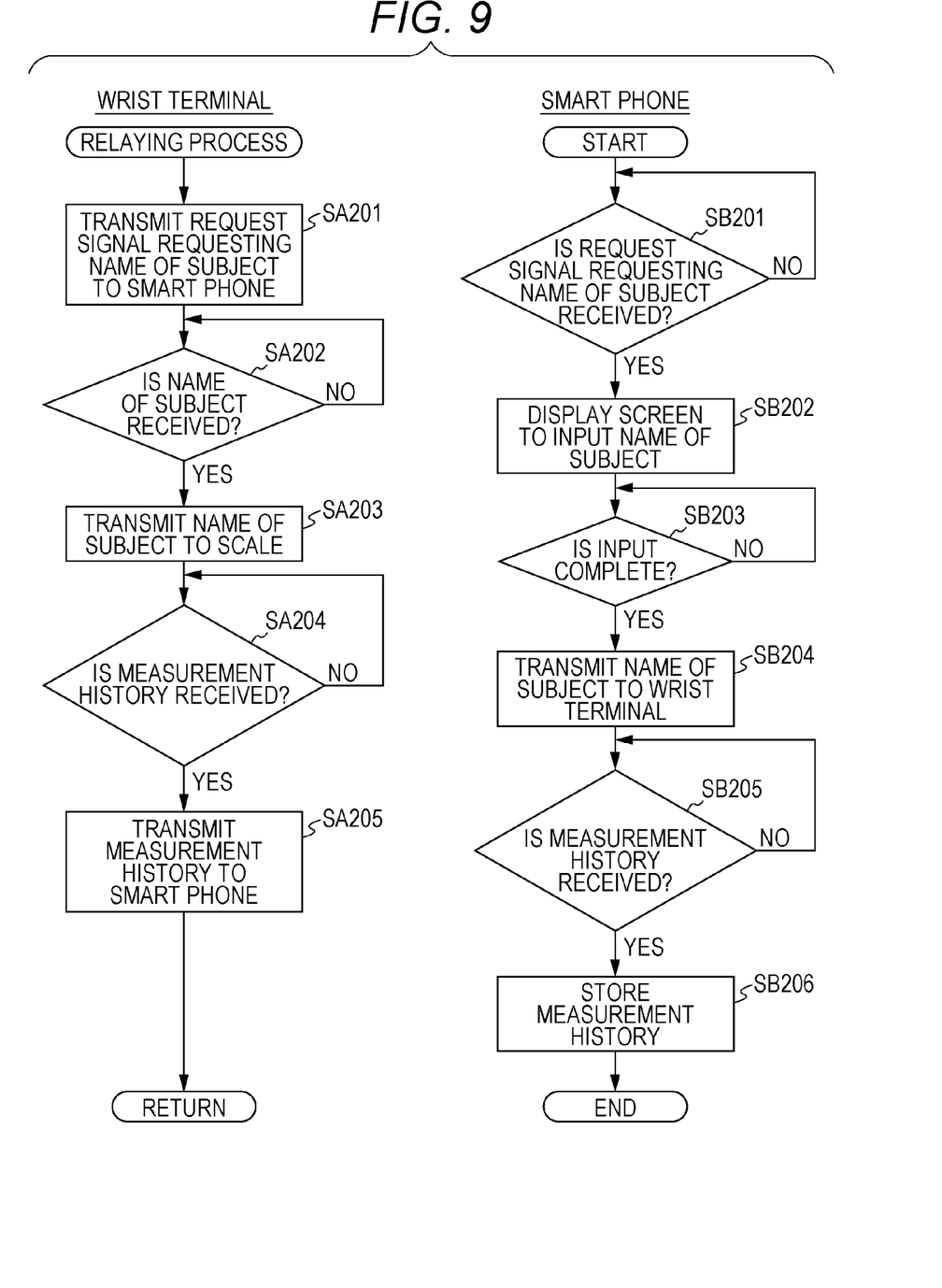
FIG. 9 is a set of flowcharts illustrating a relaying process of the wrist terminal and the operation of the smart phone.

FIG. 9 is a set of flowcharts illustrating an operation related to the relaying process performed by the wrist terminal 1 and an operation of the smart phone 2 corresponding to the relaying process.

In performing the relaying process, the wrist terminal 1 immediately transmits the request signal requesting the name of the subject to the smart phone 2 (step SA201) and waits for the name of the subject to be received (step SA202).

On the other hand, the smart phone 2 receives the request signal requesting the name of the subject from the wrist terminal 1 (step SB201: YES) and displays the screen to input the name of the subject on the display unit 202 as illustrated in FIG. 10D (step SB202), so that the user inputs the name of the subject on the smart phone 2.

When the user inputs the name of the subject (step SB203: YES), the smart phone 2 transmits the input name of the subject to the wrist terminal 1 by way of the wireless I/F 217

(step SB204) and continues to wait for the measurement history to be received (step SB205).

The wrist terminal 1 receives the name of the subject from the smart phone 2 (step SA202: YES) and then transmits the received name of the subject to the scale 501 by way of the NFC I/F 119 (step SA203).

Subsequently, the wrist terminal 1 receives the measurement history from the scale 501 (step SA204: YES) and then transmits the received measurement history to the smart phone 2 (step SA205).

The smart phone 2 receives the measurement history from the wrist terminal 1 (step SB205: YES) and saves the received measurement history in the built-in memory 216 (step SB206).

Accordingly, the user can save the measurement history of the arbitrary subject designated into the smart phone 2 and use the measurement history on the smart phone 2. Note that, as is the case with the wrist terminal 1, the specific use of the measurement result on the smart phone 2 includes displaying the past measurement result one by one on the display unit 202 or displaying the graphical representation of the past measurement result, for example. The measurement history is used on the smart phone 2 by using the predetermined application program corresponding to the scale 501.

As described above, the wrist terminal 1 of the present embodiment can acquire the measurement history of weight of the specific subject from the scale 501 by transmitting the name of the subject to the scale 501, and can make the measurement history available for use not only on the own device but also the smart phone 2. As a result, the convenience in using the measurement history, or the specific information acquired via contactless communication, can be improved.

In the present embodiment, moreover, the wrist terminal 1 functions as a relay that communicates data between the scale 501 and the smart phone 2, whereby the name of the subject requested from the scale 501 in acquiring the measurement history can be input by using the smart phone 2, not the wrist terminal 1. This can also improve the convenience in using the measurement history.

There has been described the case in the present embodiment where the wrist terminal 1 allows the user to select the operation method by always displaying the operation menu Mb when acquiring the measurement history from the scale 501 via contactless communication. However, the user always needs to acquire the latest measurement history when using the measurement history stored in the scale 501 on the wrist terminal or the smart phone 2, which means that the user holds the wrist terminal 1 over the scale 501 on a regular basis.

Accordingly, aside from the present embodiment, the wrist terminal 1 may be configured to be able to perform setting such that the operation of the wrist terminal 1 when it is held over the scale 501, or the operation method, is fixed to the operation method determined in advance by the user. In other words, the wrist terminal 1 may be configured to allow the user to designate in advance the entity in which the measurement history is used. This can save the user from taking the trouble to select the operation method from the operation menu Mb whenever holding the wrist terminal 1 over the scale 501.

While there has been described the case in the present embodiment where the name of the subject (nickname) is used as the information transmitted to the scale 501 (information requested from the scale 501) when the wrist terminal 1 acquires the measurement history, such information may instead be another information such as a password.

Moreover, the information acquired by the wrist terminal 1 according to the present invention may be an arbitrary piece of information held not only in the scale 501 but another device (a third device) other than the smart phone 2.

While there has been described the case in the present embodiment where the wrist terminal 1 is used in combination with the smart phone 2, the wrist terminal 1 may employ contactless communication to provide specific information to an arbitrary external device such as a tablet mobile information terminal with a screen larger than that of the smart phone 2.

In this case, the user can easily acquire the measurement history from the scale 501 by using the wrist terminal 1 even when the tablet mobile information terminal or the like has the function as an NFC tag reader, whereby the user can use the measurement history without taking the trouble to hold the mobile information terminal or the like with a large external diameter over the scale 501.

While the present invention is applied to the watch type wrist terminal 1 as described in the first and second embodiments, the mobile device that acquires specific information via contactless communication may also take the form to be worn around the neck of the user, for example. It is however desired that the mobile device be of the watch type considering the convenience.

While some embodiments and the variation thereof according to the present invention have been described, these embodiments can be modified as appropriate as far as the effects of the present invention can be obtained, where the modified embodiments are to be included in the scope of the invention described in claims and an equivalent invention as well.

The invention claimed is:

1. A mobile device comprising:
   a first communication unit configured to perform contactless communication;
   a second communication unit configured to perform wireless communication with an external device;
   a designation control unit configured to designate a device, between the mobile device and the external device, which is to make use of specific information that is received from outside via contactless communication by the first communication unit;
   a first specific process unit configured to execute a specific process to use the specific information when the designation control unit designates the mobile device; and
   a transmitting control unit configured to control the second communication unit to transmit the specific information received by the first communication unit to the external device, when the designation control unit designates the external device.

2. The mobile device according to claim 1, wherein when the designation control unit designates the external device, the transmitting control unit controls the second communication unit to transmit a request signal along with the specific information to the external device, the request signal requesting the external device to execute a specific process to use the specific information.

3. The mobile device according to claim 1, wherein the specific information is information used to connect to predetermined content.

4. The mobile device according to claim 3, wherein the specific process is a process for reproducing the predetermined content.

5. The mobile device according to claim 3, wherein the specific process is a process for saving the specific information.

6. The mobile device according to claim 1, further comprising a second transmitting control unit configured to control the first communication unit to transmit predetermined information requested from a third device different from the external device to the third device, after the first communication unit receives the specific information from the third device by performing contactless communication with the third device.

7. The mobile device according to claim 6, further comprising an input unit configured to input the predetermined information,
wherein the second transmitting control unit is configured to control the first communication unit to transmit the predetermined information input by the input unit to the third device.

8. The mobile device according to claim 6, further comprising:
a third transmitting control unit configured to control the second communication unit to transmit a request signal requesting the predetermined information to the external device when the designation control unit designates the external device; and
a receiving control unit configured to control the second communication unit to receive the predetermined information transmitted from the external device,
wherein the second transmitting control unit is configured to control the first communication unit to transmit the predetermined information to the third device, the predetermined information being received from the external device by the second communication unit.

9. The mobile device according to claim 1, the mobile device comprising a watch-type body.

10. The mobile device according to claim 1, wherein the transmitting control unit controls the second communication unit to transmit, to the external device, (i) the specific information received by the first communication unit, and (ii) process information indicating a type of process to be performed by the external device, when the designation control unit designates the external device.

11. The mobile device according to claim 10, wherein the specific information is information for connecting to predetermined content and the process information indicates a process for reproducing the predetermined content by the external device.

12. The mobile device according to claim 10, wherein the specific information is information for connecting to predetermined content and the process information indicates a process for storing the specific information by the external device.

13. An information utilization method performed by a mobile device including a first communication unit configured to perform contactless communication and a second communication unit configured to perform wireless communication with an external device, the method comprising:
designating a device, between the mobile device and the external device, which is to make use of specific information that is received from outside via contactless communication by the first communication unit;
executing a specific process to use the specific information when the designating designates the mobile device; and
controlling the second communication unit transmit the specific information received by the first communication unit to the external device, when the designating designates the external device.

14. A non-transitory computer readable recording medium on which a program is recorded, the program being executable to control a computer, which includes a first communication unit configured to perform contactless communication and a second communication unit configured to perform wireless communication with an external device, to function as:
a designation control unit configured to designate a device, between the mobile device and the external device, which is to make use of specific information that is received from outside via contactless communication by the first communication unit;
a specific process unit configured to execute a specific process to use the specific information when the designation control unit designates the mobile device; and
a transmitting control unit configured to control the second communication unit to transmit the specific information received by the first communication unit to the external device, when the designation control unit designates the external device.

15. An information utilization system that is an information processing system comprising a mobile device and an external device that can perform wireless communication with the mobile device, wherein:
the mobile device includes:
a first communication unit configured to perform contactless communication;
a second communication unit configured to perform wireless communication with the external device;
a designation control unit configured to designate a device, between the mobile device and the external device, which is to make use of specific information that is received from outside via contactless communication by the first communication unit;
a first specific process unit configured to execute a specific process to use the specific information when the designation control unit designates the mobile device; and
a transmitting control unit configured to control the second communication unit to transmit the specific information received by the first communication unit to the external device, when the designation control unit designates the external device, and
the external device includes:
a receiving unit configured to receive the specific information transmitted from the mobile device via the wireless communication; and
a second specific process unit configured to execute a specific process to use the specific information received by the receiving unit.

16. The information utilization system according to claim 15, wherein:
the mobile device further comprises:
a third transmitting control unit configured to control the second communication unit to transmit a request signal requesting predetermined information to the external device when the designation control unit designates the external device;
a receiving control unit configured to control the second communication unit to receive the predetermined information transmitted from the external device; and
a second transmitting control unit configured to control the first communication unit to transmit the predetermined information to a third device, the predetermined information being received from the external device by the second communication unit, and
the external device receives the request signal transmitted from the mobile device via the wireless communication by the receiving unit, and further comprises a transmitting unit configured to transmit the predetermined information to the mobile device via the wireless communication.

17. The information utilization system according to claim 15, wherein:
the transmitting control unit controls the second communication unit to transmit, to the external device, (i) the specific information received by the first communication unit, and (ii) process information indicating a type of process to be performed by the external device, when the designation control unit designates the external device,
the receiving unit receives the specific information transmitted from the mobile device via the wireless communication and the process information indicating the type of process to be performed by the external device, and
the second specific process unit executes the type of process indicated by the process information using the specific information received by the receiving unit.

* * * * *